US009004247B2

(12) United States Patent
Wang

(10) Patent No.: US 9,004,247 B2
(45) Date of Patent: Apr. 14, 2015

(54) MOBILE POWER PACK WITH BUILT-IN RETRACTABLE CABLE

(71) Applicants: Hong Fu Jin Precision Industry (ShenZhen) Co., Ltd., Shenzhen (CN); Hon Hai Precision Industry Co., Ltd., New Taipei (TW)

(72) Inventor: Man-Zhong Wang, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 172 days.

(21) Appl. No.: 13/864,233

(22) Filed: Apr. 16, 2013

(65) Prior Publication Data

US 2014/0110206 A1    Apr. 24, 2014

(30) Foreign Application Priority Data

Oct. 24, 2012    (CN) .......................... 2012 1 0409128

(51) Int. Cl.
| | |
|---|---|
| H02G 11/02 | (2006.01) |
| B65H 75/48 | (2006.01) |
| H04M 1/15 | (2006.01) |
| B65H 75/44 | (2006.01) |
| H02J 7/00 | (2006.01) |
| H02G 11/00 | (2006.01) |

(52) U.S. Cl.
CPC ................. *H04M 1/15* (2013.01); *B65H 75/48* (2013.01); *B65H 75/4402* (2013.01); *B65H 2701/34* (2013.01); *H02J 7/00* (2013.01); *H02G 11/003* (2013.01)

(58) Field of Classification Search
CPC .. B65H 75/368; B65H 2701/34; B65H 75/48; B65H 75/4402; H02G 11/00; H02G 11/02; H02G 11/003; H04M 1/15

USPC ....... 191/12 R, 12.2 R, 12.4; 242/379, 379.1, 242/385, 385.1, 385.2, 388.9, 388.91

See application file for complete search history.

(56) References Cited

U.S. PATENT DOCUMENTS

| | | | | |
|---|---|---|---|---|
| 4,174,816 | A | * | 11/1979 | Olson ........................... 242/272 |
| 4,691,806 | A | * | 9/1987 | Jansen et al. ................... 187/227 |
| 5,117,859 | A | * | 6/1992 | Carlson ..................... 137/355.25 |
| 5,156,349 | A | * | 10/1992 | Wilson et al. ............... 242/388.9 |
| 6,854,575 | B1 | * | 2/2005 | Desormeaux et al. ....... 191/12.4 |
| 7,086,512 | B2 | * | 8/2006 | Shack et al. .................. 191/12.4 |
| 7,617,840 | B1 | * | 11/2009 | Zinda ........................ 137/355.23 |
| 7,926,619 | B2 | * | 4/2011 | Stein et al. ..................... 187/226 |
| 8,469,303 | B2 | * | 6/2013 | Feldstein et al. ........... 242/388.9 |
| 2006/0273211 | A1 | * | 12/2006 | Langberg et al. ........ 242/388.91 |
| 2008/0156922 | A1 | * | 7/2008 | Rabinowitz et al. ........... 242/372 |
| 2012/0061503 | A1 | * | 3/2012 | Harty ............................ 242/379 |
| 2014/0262665 | A1 | * | 9/2014 | Giles ............................ 191/12.4 |

* cited by examiner

*Primary Examiner* — Zachary Kuhfuss
(74) *Attorney, Agent, or Firm* — Novak Druce Connolly Bove + Quigg LLP

(57) ABSTRACT

A mobile power pack includes a cover over a guide track which includes first, second, third, and fourth turning points. A sliding block defines a sliding groove to receive a ball, and the slotted ball interacts with the guide track. An elastic element is connected to the sliding block. When a cable is pulled out, the sliding block slides from the first turning point to the second turning point. When the pull on the cable is released, the elastic element restores to cause the sliding block to move until the ball reaches the third turning point, to lock the cable in position. When the cable is pulled and released, the sliding block slides until the ball reaches the fourth turning point, allowing the cable to be retracted into the body of the power pack.

7 Claims, 6 Drawing Sheets

MOBILE POWER PACK WITH BUILT-IN RETRACTABLE CABLE

BACKGROUND

1. Technical Field

The present disclosure relates to mobile power packs and, particularly, to a mobile power pack having a built-in retractable cable.

2. Description of Related Art

When a mobile power pack is used to charge an external device, a cable is employed to connect the mobile power pack to an external device. Thus, a cable for a mobile power pack is always required. However, as the mobile power pack and the cable are separate, it may be inconvenient to carry both the mobile power pack and the separate cable.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
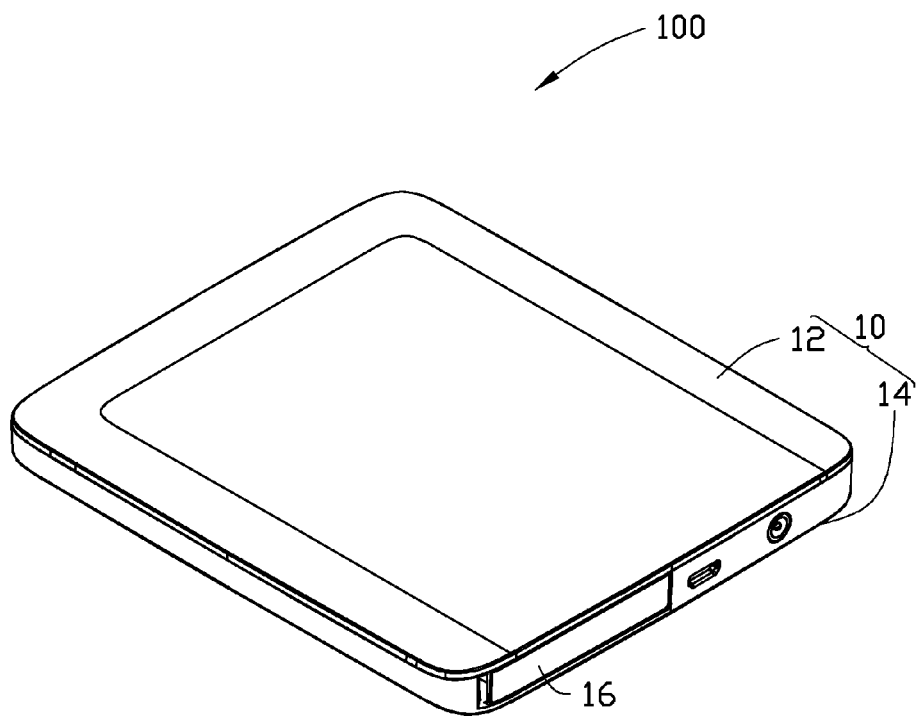
FIG. 1 is an isometric view of a mobile power pack in accordance with an exemplary embodiment.

Referring to FIG. 1, an embodiment of a mobile power pack 100 includes a housing 10. The housing 10 includes a top cover 12 and a bottom cover 14 latched to the top cover 12. A side cover 16 is mounted on a sidewall of the bottom cover 14. The side cover 16 can be opened and closed.

Figure 2:
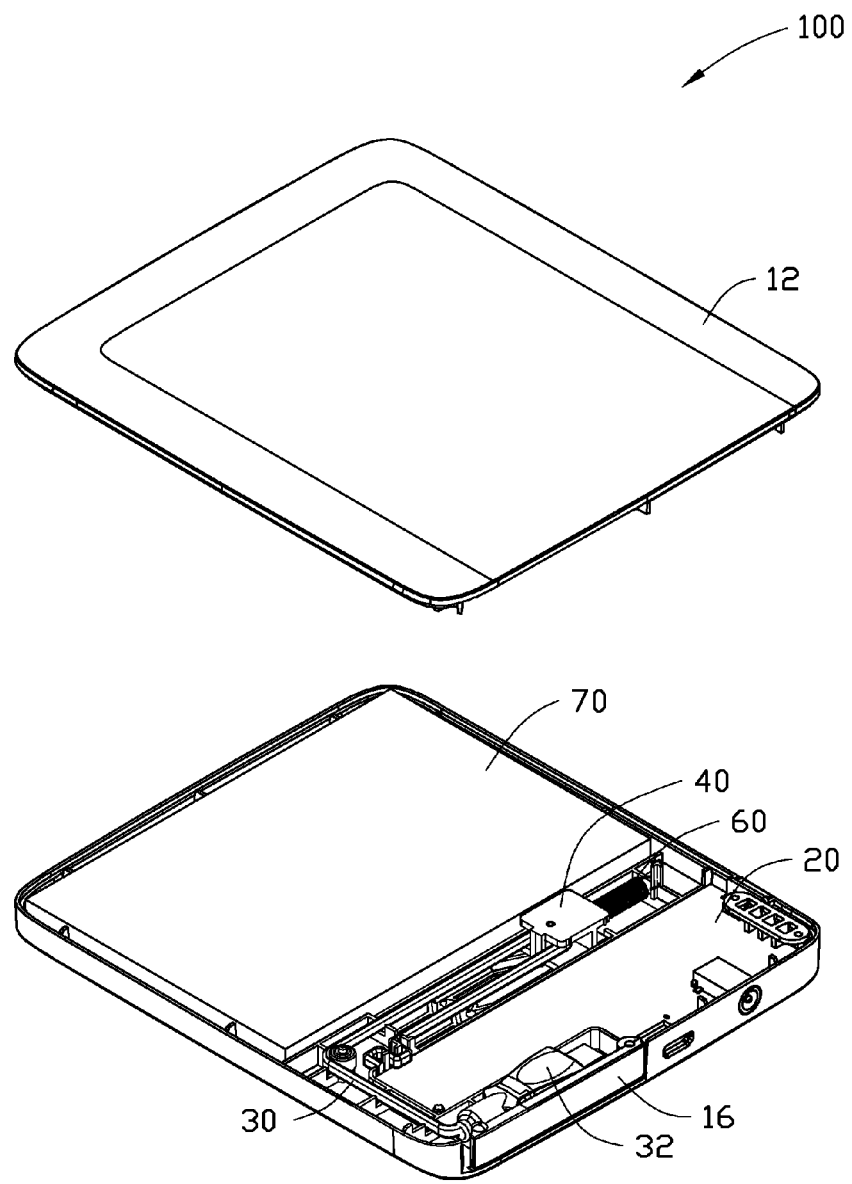
FIG. 2 is a partial, exploded, perspective view of the mobile power pack of FIG. 1.

Referring to FIG. 2, the mobile power pack 100 further includes a circuit board 20, a cable 30, and a battery module 70 which are all received in the housing 10. The circuit board 20 is arranged on the bottom cover 14 and adjacent to the side cover 16.

Figure 3:
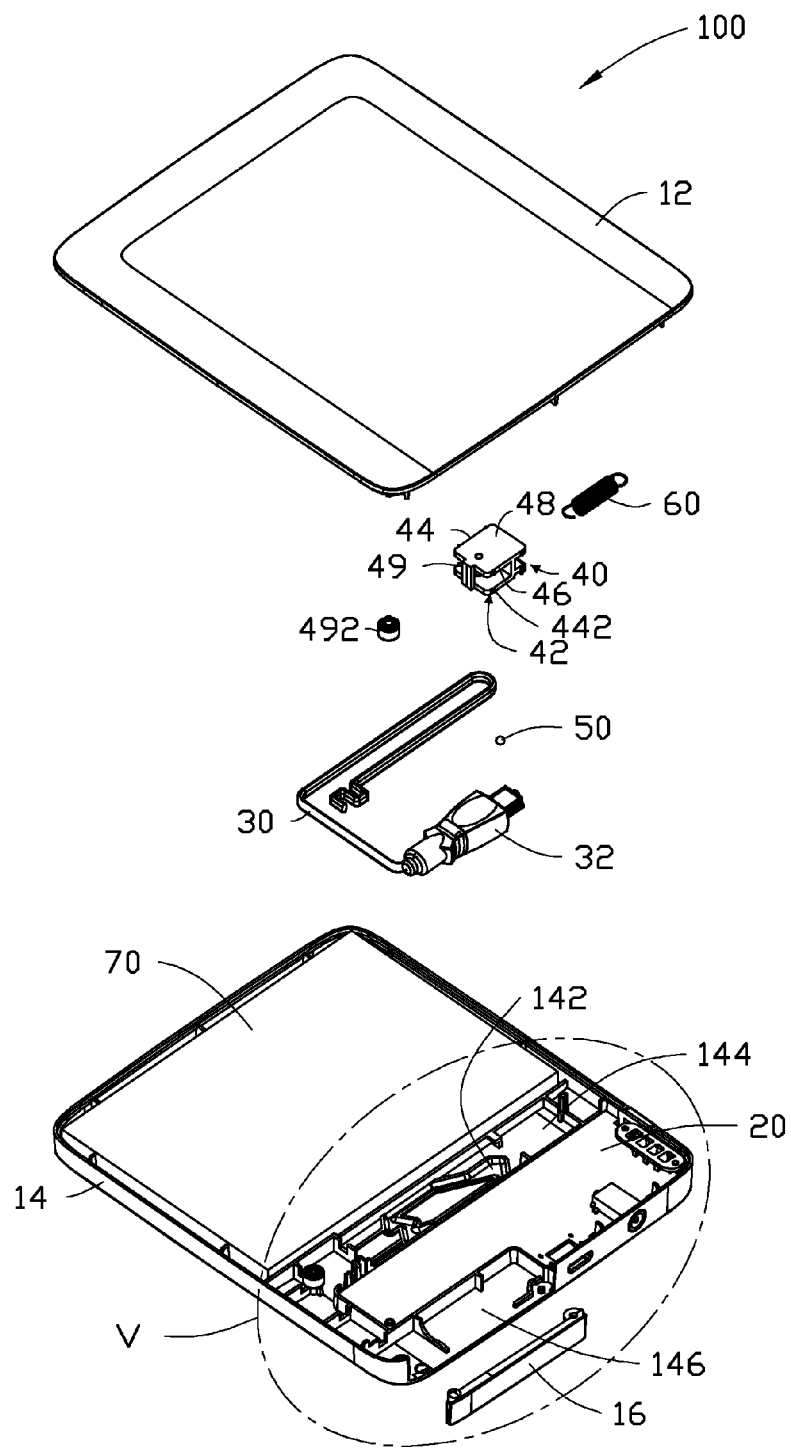
FIG. 3 is an exploded, perspective view of the mobile power pack of FIG. 1.
Figure 4:
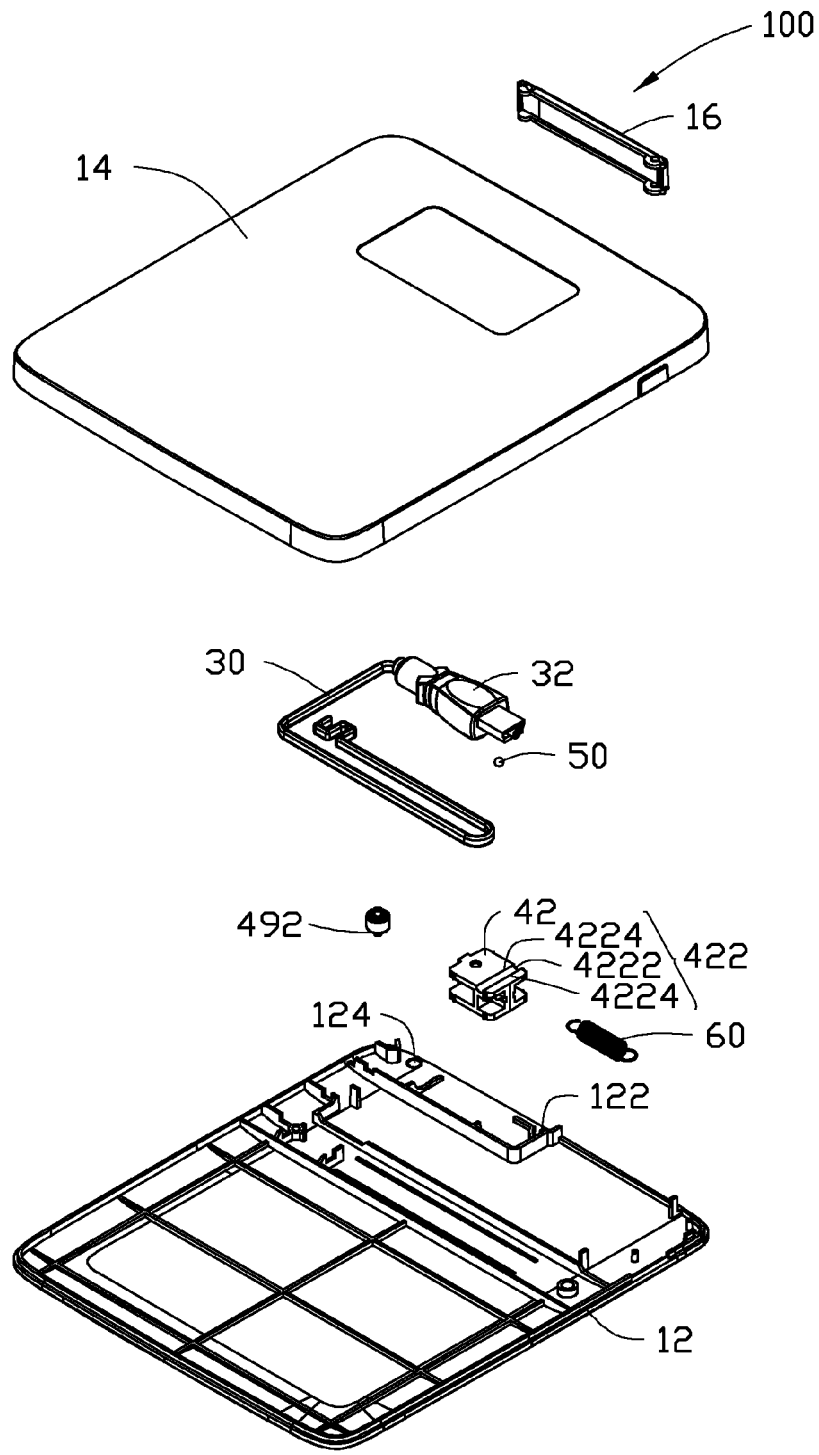
FIG. 4 is an exploded, perspective view of the mobile power pack of FIG. 1, but viewed from another viewpoint.
Figure 5:
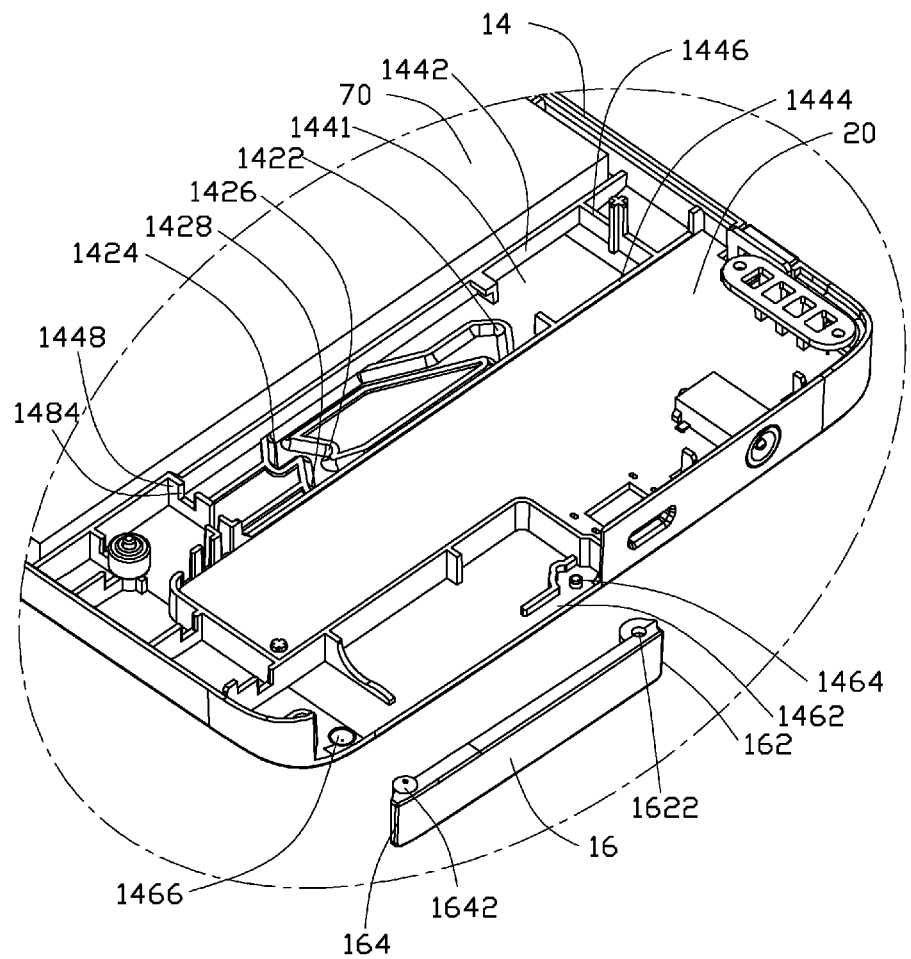
FIG. 5 is an enlarged, perspective view of FIG. 3, taken of a circle V.
Figure 6:
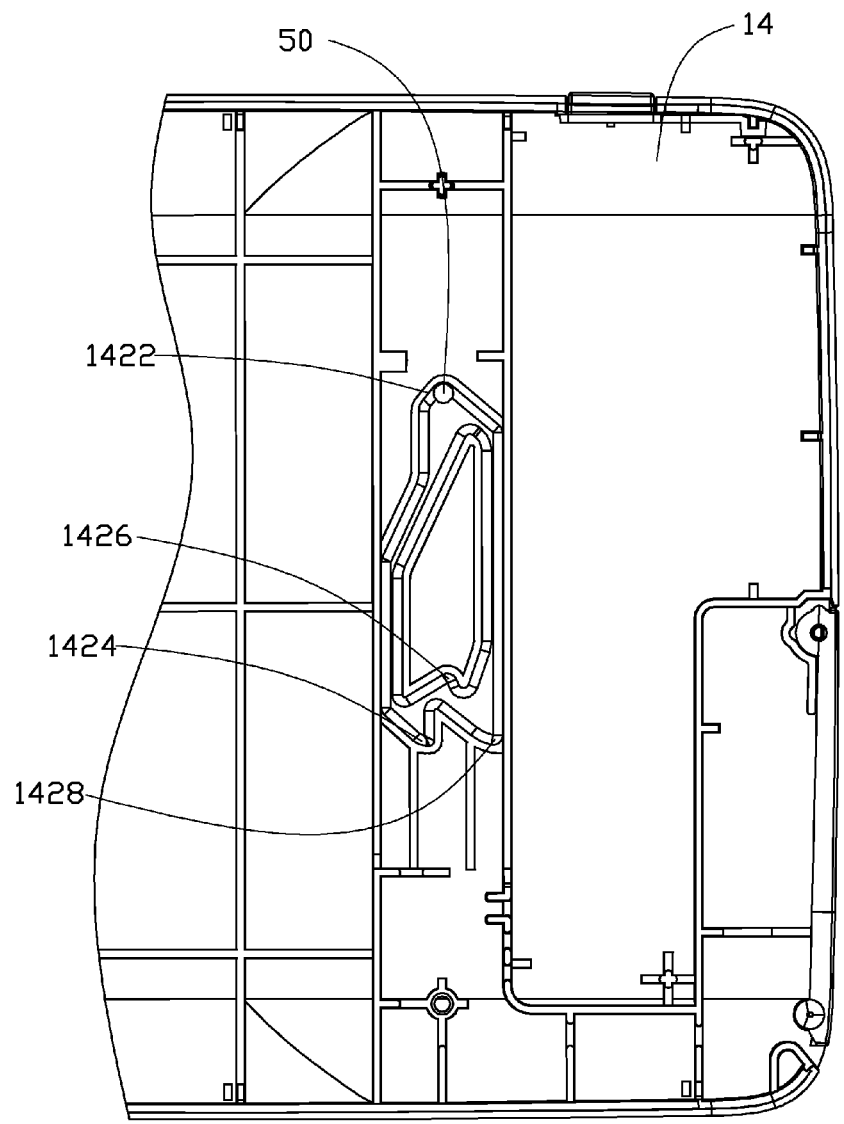
FIG. 6 is a partial, planform view of the bottom cover of FIG. 3.

The battery module 70 is arranged on the bottom cover 14 and far away from the side cover 16. A plug 32 of the cable 30 is received in the bottom cover 14 and adjacent to the side cover 16. A sliding block 40 is connected to the bottom cover 14 via an elastic element 60. Between the top cover 12 and the bottom cover 14, the sliding block 40 can slide in both a first direction and a second direction opposite to the first direction along a lateral side of the housing 10. The sliding block 40 allows the cable 30 to be pulled out, holds the cable 30 in one fixed position when pulled out, and allows the cable to be re-gathered, all by virtue of the interaction between a tracked ball 50 (see FIG. 3) and a guide track 142 (see FIG. 3). To take out the cable 30, the side cover 16 is opened, and the plug 32 is manually taken out and pulled. When the plug 32 is pulled out, the sliding block 40 is pulled by the cable 30 against the elastic force of the elastic element 60, and the sliding block 40 slides toward the first direction until a portion of the cable 30 is pulled out of the housing 10. At this point, the mobile power pack 100 can be used to charge an external device. After use, the elastic force of the elastic element 60 can pull the sliding block 40 to move toward the second direction until the cable 30 is again fully received in the housing 10. The side cover 16 is then closed.

Referring to FIGS. 3-6, in the embodiment, the bottom cover 14 defines a first receiving portion 144 and a second receiving portion 146. The first receiving portion 144 receives the sliding block 40 and the elastic element 60. The second receiving portion 146 receives the plug 32. The circuit board 20 is arranged between the first receiving portion 144 and the second receiving portion 146. The first receiving portion 144 includes a bottom sidewall 1441, a first sidewall 1442, a second sidewall 1444, a third sidewall 1446, and a fourth sidewall 1448. One end of the elastic element 60 is connected to the third sidewall 1446, and an opposite end is connected to an end of the sliding block 40. A recess 1484 is defined in the top of the fourth sidewall 1448. The cable 30 passes through the fourth sidewall 1448 via the recess 1484 to be received in the first receiving portion 144, and the cable 30 further passes through the sliding block 40 to be connected to the circuit board 20. The bottom sidewall 1441 defines the guide track 142. The guide track 142 defines a closed-loop circular channel. In this embodiment, the circular channel includes a first turning point 1422, a second turning point 1424, a third turning point 1426, and a fourth turning point 1428. The first turning point 1422 is adjacent to the elastic element 60, and the second, third, and fourth turning points 1424, 1426, 1428 are generally located at an opposite side of the circular channel to the first turning point 1422.

The sliding block 40 includes a first sidewall 44, a second sidewall 46 opposite to the first sidewall 44, a bottom surface 42, and a top surface 48. Each of the first sidewall 44 and the second sidewall 46 includes a projection 442. When the sliding block 40 is received in the first receiving portion 144, the projection 442 of the first sidewall 44 is in contact with the first sidewall 1442 of the first receiving portion 144, and the projection 442 of the second sidewall 46 is in contact with the second sidewall 1444 of the first receiving portion 144, thus the sliding block 40 can slide toward the first direction and the second direction along the first sidewall 1442 and the second sidewall 1444 of the first receiving portion 144.

The bottom surface 42 of the sliding block 40 defines a sliding groove 422 with the ball 50 slidably received therein. The sliding groove 42 is substantially perpendicular to the first sidewall 44 and the second sidewall 46 of the sliding block 40, is substantially hemispherical in section, and includes openings 4222 at both ends. The two openings 4222 and two sharp cliffs 4224 run along the length of the sliding groove 422. One opening 4222 is formed on the first sidewall 44, and the other opening 4222 is formed on the second sidewall 46. The hemispherical diameter of the opening 422 is equal to the diameter of the ball 50. The distance between the two cliffs 4224 is less than the diameter of the ball 50. The depth of the sliding groove 422 is less than the diameter of the ball 50. With such configuration, when the sliding block 40 is received in the first receiving portion 144, a portion of the ball 50 is received in the sliding groove 422, and another portion of the ball 50 is received in the guiding slot 142. The sliding block 40 further defines a cavity 49 extending through the first sidewall 44 and the second sidewall 46, and includes a post 492 arranged within the cavity 49 and connecting the bottom surface 42 to the top surface 48. The cable 30 goes around the post 492 and is connected to the circuit board 20. With such configuration, when the cable 30 is pulled, the sliding block 40 is pulled by the cable 30 to move toward the first direction. When the sliding block 40 is pulled toward the second direction by the elastic force of the elastic element 60, the cable 30 is pulled by the sliding block 40 back into the housing 10.

In the embodiment, initially, the sliding block 40 stays in an original position by the elastic force of the elastic element 60, where the ball 50 is located at the first turning point 1422. At this point, the cable 30 is received in the housing 10. To use the mobile power pack 100 to charge an external device, the side cover 16 is opened, and the plug 32 of the cable 30 is manually pulled out of the housing 10. When the cable 30 is pulled, the sliding block 40 moves toward the first direction, and the ball 50 accordingly slides along the guide track 142, and the elastic element 60 is accordingly put under tension. When the ball 50 reaches the second turning point 1424, the ball 50 and the guide track 142 cooperatively prevent the sliding block 40 from moving toward the first direction. At this point, a portion of the cable of the cable 30 will have been pulled out of the housing 10. When the pull on the cable 30 is released, the elastic element 60 restores to cause the sliding block 40 to move toward the second direction until the ball 50 reaches the third turning point 1426. In the third turning point 1426, the ball 50 and the guide track 152 cooperatively hold the sliding block 40 in position. At this point, the mobile power pack 100 can be used to charge the external device. After use of the mobile power pack 100, the cable 30 is manually pulled again, and the sliding block 40 moves toward the first direction until the ball 50 reaches the fourth turning point 1428. In the fourth turning point 1428, the ball 50 and the guide track 142 cooperatively prevent the sliding block 40 from moving only toward the first direction. At this point, the cable 30 is released. The elastic element 60 restores to cause the sliding block 40 to move toward the second direction until the ball 50 returns to the first turning point 1422. The sliding of the sliding block 40 pulls the cable 30 back into the housing 10.

In the embodiment, the second receiving portion 146 includes an opening 1462 formed on the bottom cover 14. The bottom of the second receiving portion 146 includes a first positioning post 1464 and a first receiving hole 1466. The top cover 12 includes a second positioning post 122 and a second receiving hole 124 facing the bottom cover 14. The side cover 16 includes a first end 162 and a second end 164 opposite to the first end 162. The first end 162 defines two spaced and coaxial axis holes 1622. The second end 164 includes two spaced and coaxial elastic protrusions 1642. The first positioning post 1464 and the second positioning post 122 are received in the axis holes 1622. The elastic protrusions 1642 are received in the first receiving hole 1466 and the second receiving hole 124. With such configuration, the side cover 16 can be opened and closed. In the embodiment, a gap (not labeled) is defined between the second end 164 of the side cover 16 and the sidewall of the bottom cover 14, thus users can conveniently open and close the side cover 16.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:
1. A mobile power pack comprising:
a top cover;
a bottom cover latched to the top cover, the top cover and the bottom cover cooperatively forming a housing, a guide track formed on a bottom surface of the bottom cover, the guide track defining a closed-loop circular channel, the circular channel comprising a first turning point, a second turning point, a third turning point, and a fourth turning point;
a circuit board;
a cable comprising a plug, the cable electrically connected to the circuit board;
a ball;
a sliding block defining a sliding groove with the ball slidably received therein, the sliding block being arranged on the guide track with the ball partially received in the circular channel, the sliding block being slidable toward a first direction and a second direction opposite to the first direction along a lateral side of the bottom cover; and
an elastic element, one end of the elastic element being connected to the bottom cover, and an opposite end of the elastic element being connected to the sliding block;
wherein, one end of the cable passes through the sliding block and is connected to the circuit board, an elastic force of the elastic element causes the sliding block to stay in an initial position, where the ball is located at the first turning point, when the plug of the cable is manually pulled out of the housing, the sliding block slides toward the first direction until the ball reaches the second turning point, when the ball reaches the second turning point, the elastic element is stretched, and the ball and the guide track cooperatively prevent the sliding block from sliding toward the first direction, when the pull on the cable is released, the elastic element restores to cause the sliding block to move toward the second direction until the ball reaches the third turning point, when the ball reaches the third turning point, the ball and the guide track cooperatively hold the sliding block in position, when the cable is manually pulled again, the sliding block slides toward the first direction until the ball reaches the fourth turning point, when the ball reaches the fourth turning point, the ball and the guide track cooperatively prevent the sliding block from moving toward the first direction, when the pull on the cable is released, the elastic element restores to cause the sliding block to move toward the second direction until the ball returns to the first turning point.

2. The mobile power pack as described in claim 1, wherein the first turning point is adjacent to the elastic element, and the second, third, and fourth turning points are generally located at an opposite side of the circular channel to the first turning point.

3. The mobile power pack as described in claim 1, wherein the bottom cover defining a first receiving portion to receive the sliding block, the first receiving portion comprises a first sidewall and a second sidewall opposite to the first sidewall, the sliding block comprises a first sidewall and a second sidewall opposite to the first sidewall, each of the first sidewall and the second sidewall of the sliding block comprises a projection, when the sliding block is received in the first receiving portion, the projections of the first sidewall and the second sidewall of the sliding block are respectively in contact with the first sidewall and the second sidewall of the first receiving portion.

4. The mobile power pack as described in claim 3, wherein the sliding groove of the sliding block comprises two opposite openings, one of the openings is formed on the first sidewall of the sliding block, and the other of the openings is formed on the second sidewall of the sliding block, the width of the sliding groove is less than the diameter of the ball, and the depth of the sliding groove is less than the diameter of the ball.

5. The mobile power pack as described in claim 1, wherein the bottom cover further defining a second receiving portion, the plug of the cable is received in the second receiving portion.

6. The mobile power pack as described in claim 5, further comprising a side cover, wherein the second receiving portion comprises an opening formed on a sidewall of the bottom cover, the side cover is arranged within the opening of the second receiving portion and connecting the bottom cover to the top cover.

7. The mobile power pack as described in claim 6, wherein the side cover comprises a first end and a second end opposite to the first end, the first end defines two spaced and coaxial axis holes, the second end comprises two spaced and coaxial elastic protrusions, the bottom of the bottom cover comprises a first positioning post and a first receiving hole, the top cover comprises a second positioning post and a second receiving hole facing the bottom cover, each of the first positioning post and the second positioning post is received in the corresponding axis hole, and each of the elastic protrusions is received in one of the first receiving hole and the second receiving hole.

\* \* \* \* \*